US 6,564,001 B2

(12) United States Patent
Amino et al.

(10) Patent No.: US 6,564,001 B2
(45) Date of Patent: *May 13, 2003

(54) CODE MULTIPLEXING/READING APPARATUS FOR PREVENTING OUTPUTTING AN ERRONEOUS CODE

(75) Inventors: Tadashi Amino, Kobe (JP); Yoshiyuki Miyazaki, Higashiosaka (JP)

(73) Assignee: Sanyo Electric Co., Ltd., Moriguchi (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/917,749

(22) Filed: Aug. 27, 1997

(65) Prior Publication Data

US 2001/0010751 A1 Aug. 2, 2001

(30) Foreign Application Priority Data

Aug. 29, 1996 (JP) .............................................. 8-228159

(51) Int. Cl.[7] ............................................... H04N 5/94
(52) U.S. Cl. ............................ 386/47; 386/51; 348/616
(58) Field of Search ....................... 386/2–3, 40, 47–51, 386/124, 95, 94, 98; 360/32, 48; 348/616–617; H04N 5/94

(56) References Cited

U.S. PATENT DOCUMENTS

| 4,206,440 A | * | 6/1980 | Doi et al. ....................... 386/2 |
| 4,277,807 A | * | 7/1981 | Baldwin ........................ 360/32 |
| 4,287,529 A | * | 9/1981 | Tatami et al. .................. 386/51 |
| 4,315,331 A | * | 2/1982 | Lemoine et al. ............... 386/47 |
| 4,352,129 A | * | 9/1982 | Baldwin ...................... 386/124 |
| 4,467,373 A | * | 8/1984 | Taylor et al. .................. 360/32 |
| 5,134,496 A | * | 7/1992 | Schwab et al. ............... 386/94 |

* cited by examiner

Primary Examiner—Vincent Boccio
(74) Attorney, Agent, or Firm—Armstrong, Westerman & Hattori, LLP

(57) ABSTRACT

A code multiplexing/reading apparatus includes a first register. Two codes that reside in a predetermined relationship are outputted from the first register, which are superimposed on a video signal to be recorded by operation of switches. Consequently, a video recording device records a code-multiplexed video signal on a recording medium. When the code-multiplexed video signal is reproduced from the medium by a video reproducing device, two codes taken out of the reproduced video signal are compared with each other by a comparator. When the two codes are "1001101" and "0110010", the inversion of the former code agrees with the latter code. Therefore, the former code is outputted as a predetermined code from a second register.

11 Claims, 11 Drawing Sheets

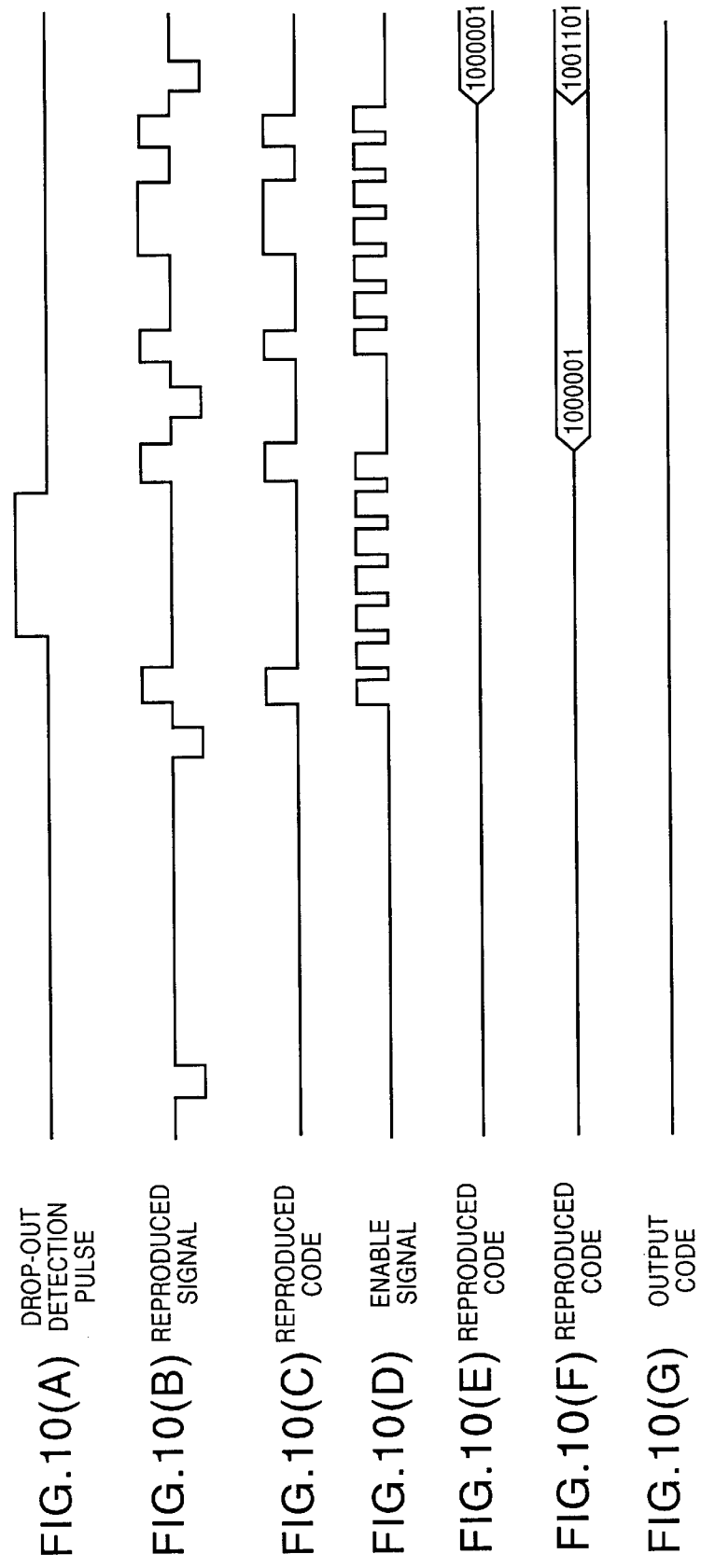

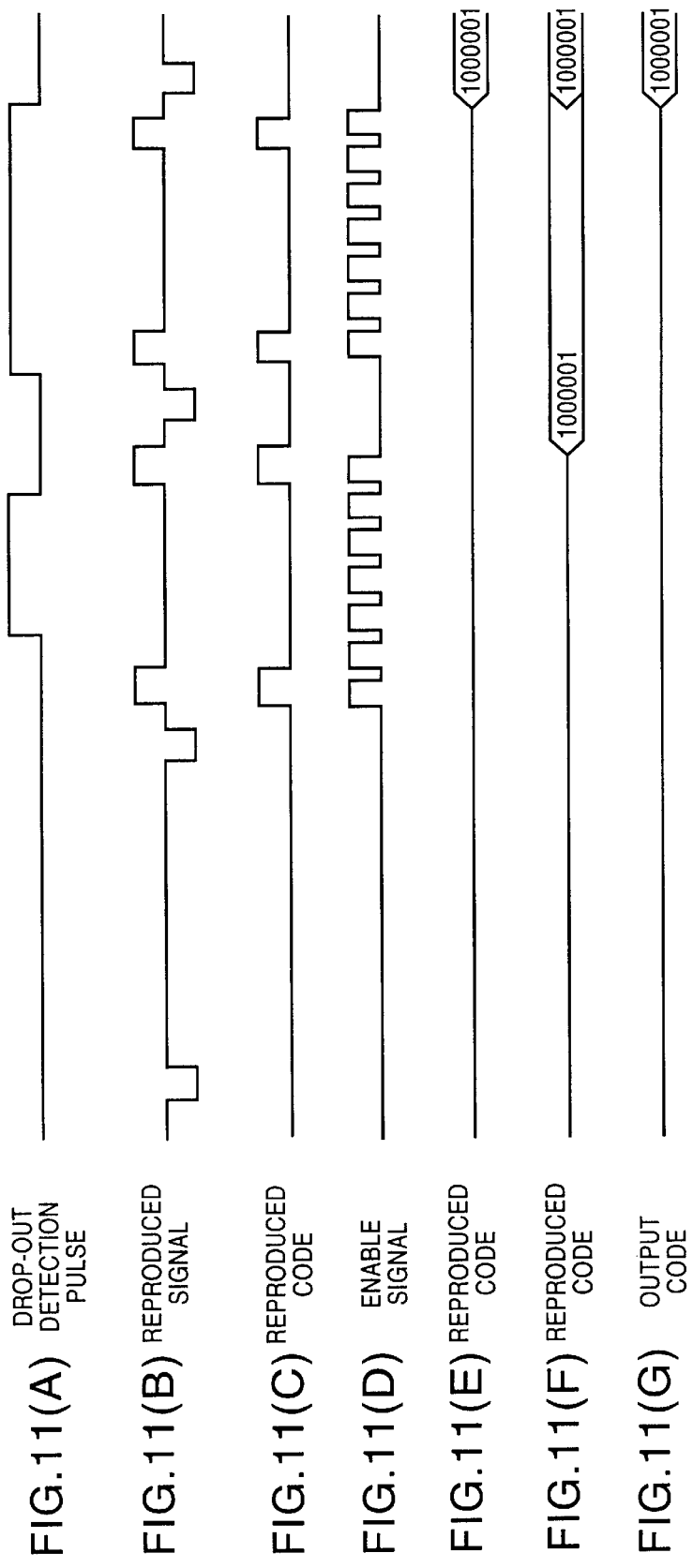

CODE MULTIPLEXING/READING APPARATUS FOR PREVENTING OUTPUTTING AN ERRONEOUS CODE

BACKGROUND OF THE INVENTION

1. Field of the Invention

This invention relates to code multiplexing/reading apparatuses, and more particularly to a code multiplexing/reading apparatus adapted to multiplex on an video signal a code, for example, for distinguishing from which monitor camera a video signal is outputted or representing a time hour at which a video signal is outputted, as well as read that code out of the video signal multiplexed therewith.

2. Description of the Prior Art

There is shown in FIG. 8 and FIG. 9 one example of a conventional code multiplexing/reading apparatus of this kind. Referring to FIG. 8, during recordation a code stored by registers 2a–2g is multiplexed on respective predetermined two horizontal lines within a vertical blanking period contained in a composite video signal so that the code is thereafter recorded on a video tape (not shown) by a VTR3. During reproduction, the composite video signal is reproduced by the VTR3 as shown in FIG. 9, and then outputted through a drop-out detection circuit 3a. That is, where it is impossible to properly reproduce a signal due to damages or mars on a video tape, the signal is subjected to addition at its drop-out portion with using a signal corresponding to that of the preceding line, thereby being outputted. The two codes multiplexed on the composite video signal are detected through a comparator 4 and a code fetching circuit 5, and they are then compared by a comparing circuit 6. If they are coincident with each other, the first multiplexed code is outputted through a register 7.

When reproducing the composite video signal that is multiplexed with a code, e.g., "1001101", even if a code first recorded is partly lost as shown in FIG. 10(A), the detected two codes will not coincide with each other as shown in FIG. 10(E) and FIG. 10(F). In this manner, an erroneous code, i.e. a code "1000001" is prevented from being outputted through the register 7.

In the prior art, however, if the first code is partly lost and further the next code be disappeared of its entirety as shown in FIG. 11(A), the first code with partly lacking is utilized for addition to a drop-out period in the latter half. In such a case, there happens coincidence between the two detected codes as shown in FIG. 11(E) and FIG. 11(F), resulting in outputting an erroneous code through the register 7.

SUMMARY OF THE INVENTION

It is therefore a primary object of the present invention to provide a code multiplexing/reading apparatus which is capable of preventing against outputting an erroneous code even when both of two codes are lost partly or in the entirety thereof.

It is another object of the present invention to provide a code reading device that can prevent against erroneously outputting a code therefrom even when both two codes are lost partly or in the entirety thereof.

It is further object of the present invention to provide a video reproducing device that can prevent against erroneously outputting a code therefrom even when both two codes are lost partly or in the entirety thereof.

It is still further object of the present invention to provide a video recording and reproducing apparatus that can prevent against erroneously outputting a code therefrom even when both two codes are lost partly or in the entirety thereof.

A code multiplexing/reading apparatus according to the present invention adapted to multiplex codes on a video signal to be recorded through a video record reproducing apparatus and read the code multiplexed on the video signal to be reproduced through the video recording and reproducing apparatus, comprises: a multiplexing means for multiplexing on a video signal two codes that are in a predetermined relationship; a code determining means for determining whether the two codes reproduced by the video reproducing apparatus are in the predetermined relationship or not; and a code output means for outputting a predetermined code when the two codes are determined that they are in the predetermined relationship by the determining means.

A code multiplexing/reading apparatus according to the present invention adapted to record a video signal multiplexed with codes on a recording medium by means of a signal recording means and reproduce the video signal multiplexed with the codes out of the recording medium by means of a signal reproducing means, comprises: a multiplexing means for multiplexing on a video signal two codes that are in a predetermined relationship: a code determining means for determining whether the two codes reproduced by the video reproducing apparatus are in the predetermined relationship or not; and a code output means for outputting a predetermined code when the two codes are determined that they are in a predetermined relationship by the determining means.

A code multiplexing/reading apparatus according to the present invention adapted to read a code that is multiplexed on a video signal to be reproduced by a video reproducing apparatus, comprises: a code determining means for determining whether two codes reproduced by the video reproducing apparatus are in a predetermined relationship or not; and a code output means for outputting a predetermined code when the two codes are determined that they are in the predetermined relationship by the determining means.

A code multiplexing/reading apparatus according to the present invention adapted to reproduced a video signal multiplexed with codes out of a recording medium by means of a signal reproducing means, comprises: a code determining means for determining whether two codes multiplexed on the video signal are in a predetermined relationship or not; and a code output means for outputting the predetermined code when the two codes are determined that they are in the predetermined relationship by the determining means.

The two codes that reside in a predetermined relationship are multiplexed during a vertical blanking period of the video signal by the multiplexing means. Here, the two codes involve for example a first code that is not inverted and a second code that is inverted in bit partly or in the entirety thereof. The video signal multiplexed with these two codes is recorded on the recording medium by means of the signal record means. The video signal multiplexed with codes is reproduced out of the recording medium by the signal reproducing means and determined by the code determining means whether the two codes involved are in the predetermined relationship or not. That is, the first code is stored by a storing means, the second code is inverted in bit partly or the entirety thereof, and an output of the storing means and an output of the inverting means are compared each other by a comparing means. If the two codes are determined that they are in the predetermined relationship, that is, these codes are determined coincident with each other, the code output means outputs a predetermined code. Here, the predetermined code refers, for example, to the first code.

In accordance with the present invention, since a predetermined code is outputted by the code output means only when the two reproduced codes reside in a predetermined relationship. Therefore, it is possible to prevent against outputting an erroneous code even when both two codes are lost partly or in the entirety thereof.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 10(A) is a waveform diagram showing a drop-out detection pulse,

FIG. 10(B) is a waveform diagram showing a reproduced composite video signal,

FIG. 10(C) is a waveform diagram showing a code contained in the reproduced composite video signal, FIG. 10(D) is a waveform diagram showing an enable signal, FIG. 10(E) is an illustrative diagram showing a code outputted from the register 38, FIG. 10(F) is an illustrative diagram showing a code inverted by the inverting circuit, and FIG. 10(G) is an illustrative diagram showing an output code; and FIG. 11(A) is a waveform diagram showing a drop-out detection pulse, FIG. 11(B) is a waveform diagram showing a reproduced composite video signal.

FIG. 11(C) is a waveform diagram showing a code contained in the reproduced composite video signal, FIG. 11(D) is a waveform diagram showing an enable signal, FIG. 11(E) is an illustrative diagram showing a code outputted from the register 38, FIG. 11(F) is an illustrative diagram showing a code inverted by the inverting circuit, and FIG. 11(G) is an illustrative diagram showing an output code.

DETAILED DESCRIPTION OF THE PREFERRED EMBODIMENT

Figure 1:
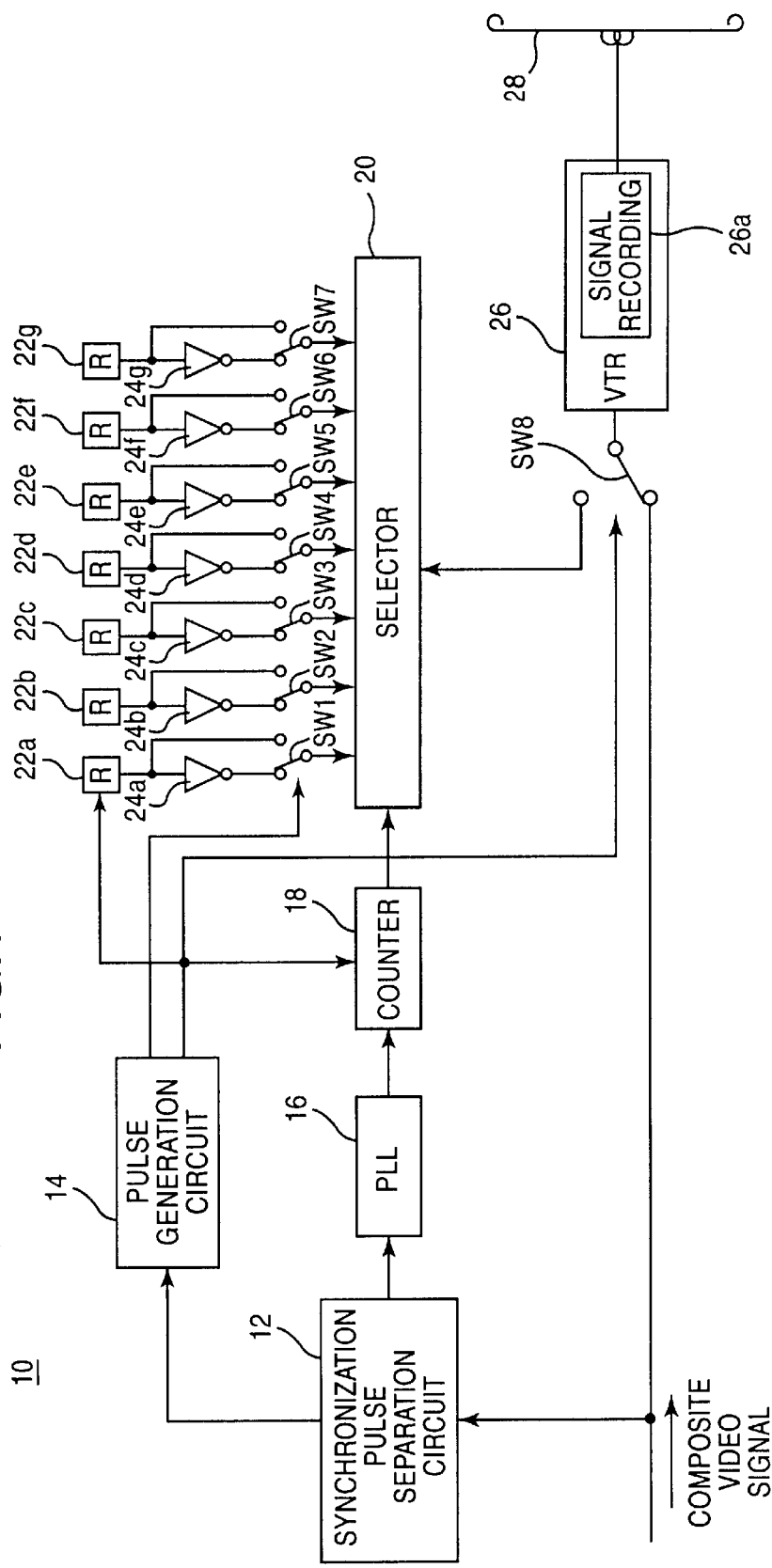
FIG. 1 is a block diagram showing one part of an embodiment of the present invention.
Figure 2:
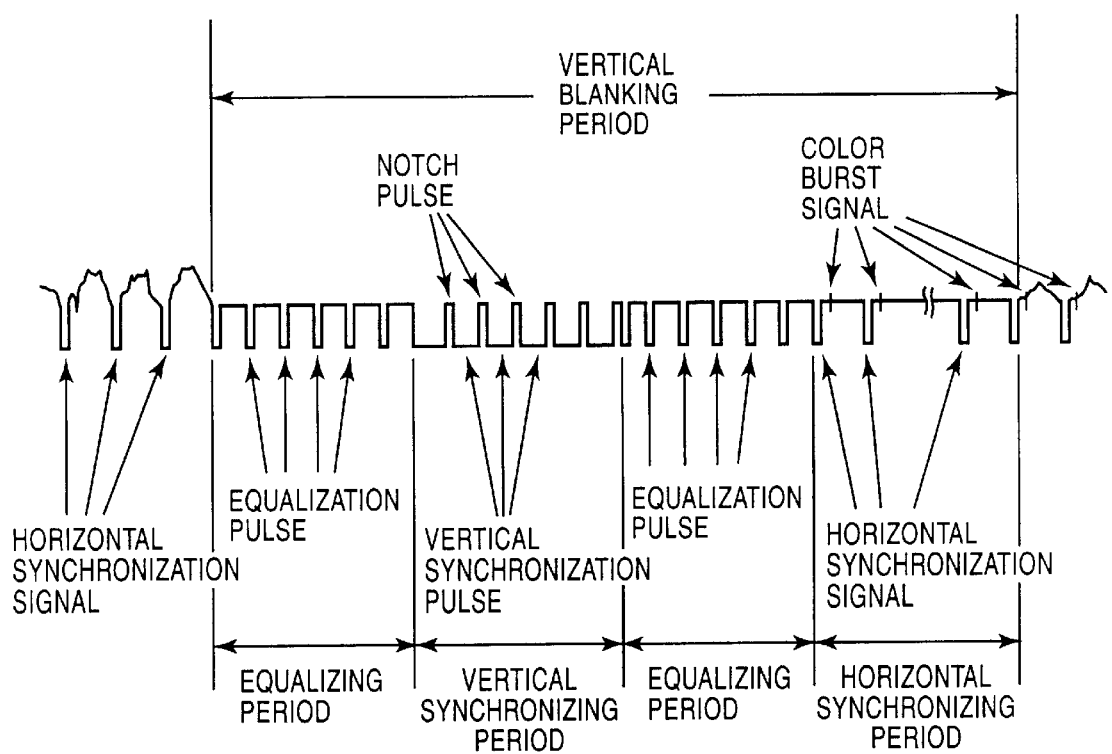
FIG. 2 is a waveform diagram showing a signal during a vertical blanking period.

Referring to FIG. 1, a code multiplexing/reading apparatus 10 of this embodiment includes a synchronization pulse separation circuit 12 where separation is done for a vertical synchronization pulse and a horizontal synchronization signal contained in a composite video signal as shown in FIG. 2. Receiving the vertical synchronization pulse, the pulse generation circuit 14 delivers, based on that pulse as a reference, to switches SW1–SW7 timing pulses that serve as a timing signal having rise portions fallen within a predetermined 1 H time period of a time duration A in a vertical blanking period excepting an equalizing period and vertical synchronization period. The pulse generation circuit 14 also provides respective timing pulses, that rise within a predetermined 1 H period and the following 1 H period, as a read-out-switching signal and an enable signal to registers 22a–22g, a switch SW8 and a counter 18. Therefore, the timing pulses delivered to the registers 22a–22g, the switch SW8 and the counter 18 vary as shown in FIG. 5(B) with respect to the horizontal synchronization signal as shown in FIG. 5(A).

Meanwhile, a PLL circuit 16 receives the horizontal synchronization signal from the synchronization pulse separation circuit 12, and delivers to the counter 18 a pulse obtained by frequency-dividing the horizontal synchronization signal by 7 and having a phase locked to a phase of the horizontal synchronization signal. The counter 18 repeats increment from "0" to "6" according to a clock supplied from the PLL circuit 16.

Figure 5:
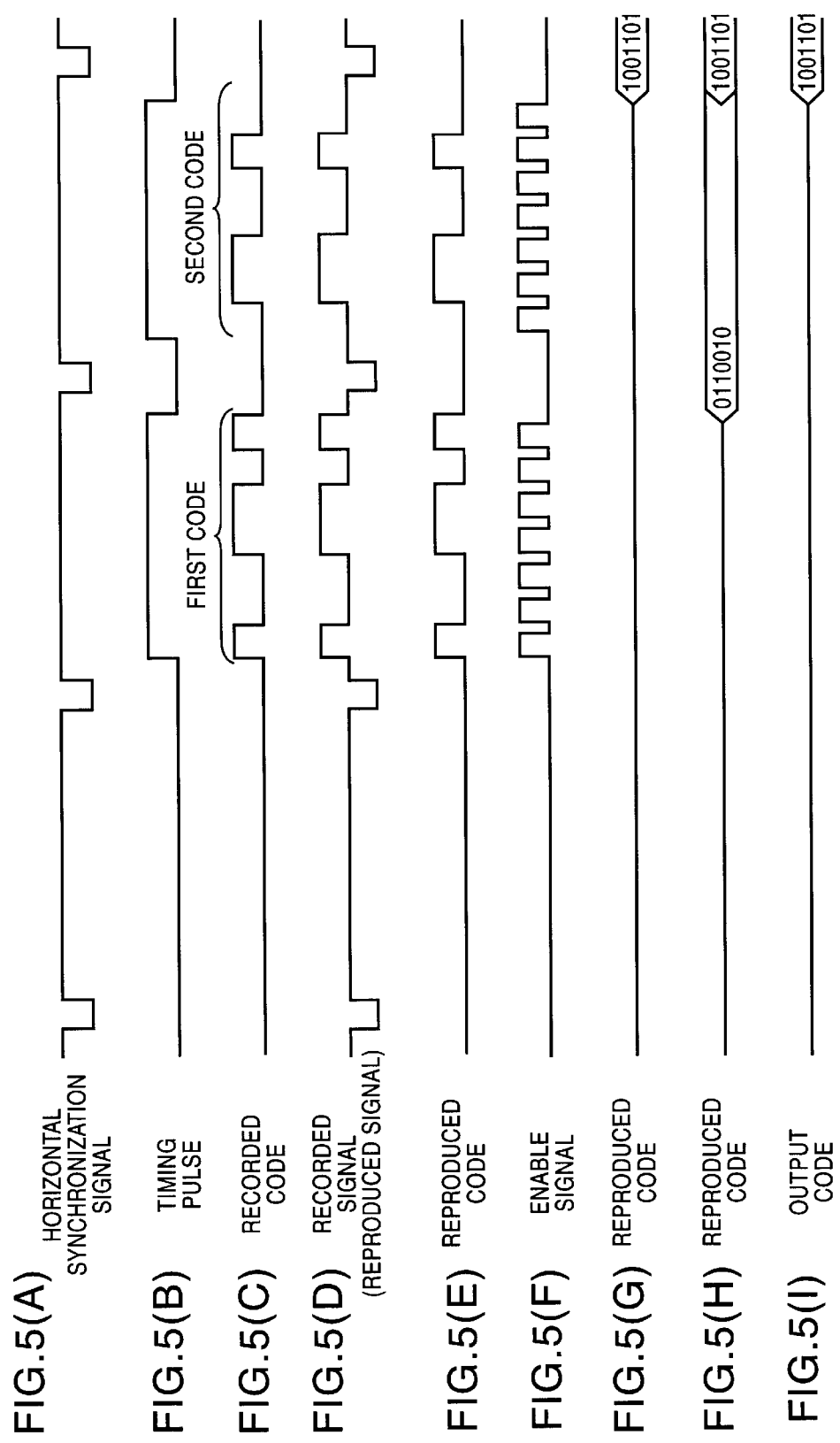
FIG. 5(A) is a waveform diagram showing a horizontal synchronization signal.
FIG. 5(B) is a waveform diagram showing a timing pulse.
FIG. 5(C) is a waveform diagram showing codes multiplexed on a composite vide signal.
FIG. 5(D) is a waveform diagram showing a composite video signal recorded by or reproduced from a VTR.
FIG. 5(E) is a waveform diagram showing a code contained in the composite video signal reproduced.
FIG. 5(F) is a waveform diagram showing an enable signal.
FIG. 5(G) is an illustrative diagram showing a code outputted from a register 38.
FIG. 5(H) is an illustrative diagram showing a code inverted by an inverting circuit.
FIG. 5(I) is an illustrative diagram showing an output code.

The registers 22a–22g are each stored with 1 bit of a 7-bit code "1001101" so that the code is read out twice based on a timing pulse as shown in FIG. 5(B). The switches SW1–SW7 are put into connection to the registers 22a–22g for the first half one 1 H period of the successive 2 H period, and connected to inverting circuits 24a–24g for the following 1 H period. Consequently, the selector 20 is supplied with the code "1001101" as a first code during the first 1 H period, and supplied with a code "0110010" as a second code during the following 1 H period. The selector 20 selects, one by one, bit data respectively supplied from the switches SW1–SW7 depending on a count value given from the counter 18. The selector 20 firstly outputs, bit by bit, the first code "1001101", and then outputs, bit by bit, the second code "0110010". That is, the selector 20 outputs codes as shown in FIG. 5(C). Since the switch SW8 is placed into connection to the selector side when the timing pulse as shown in FIG. 5(B) is at a high level, the two codes outputted from the selector 20 are multiplexed over the composite video signal as shown in FIG. 5(D).

In this manner, the composite video signal multiplexed with the codes is supplied to a recording apparatus such as a VTR 26 where it is recorded on a recording medium such as a video tape 28 by means of a signal record circuit 26a.

Figure 3:
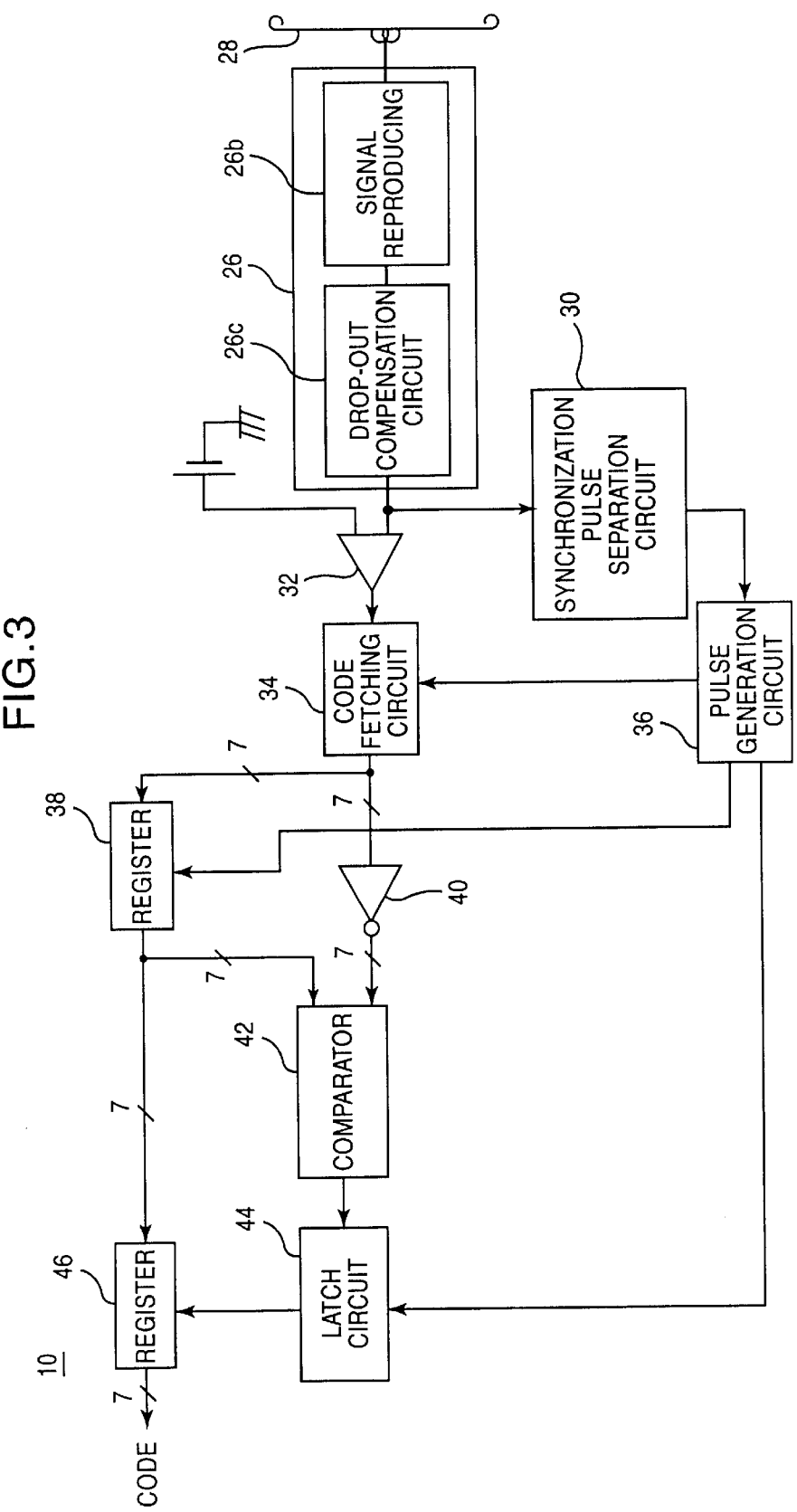
FIG. 3 is a block diagram showing another part of the embodiment of the present invention.
Figure 4:
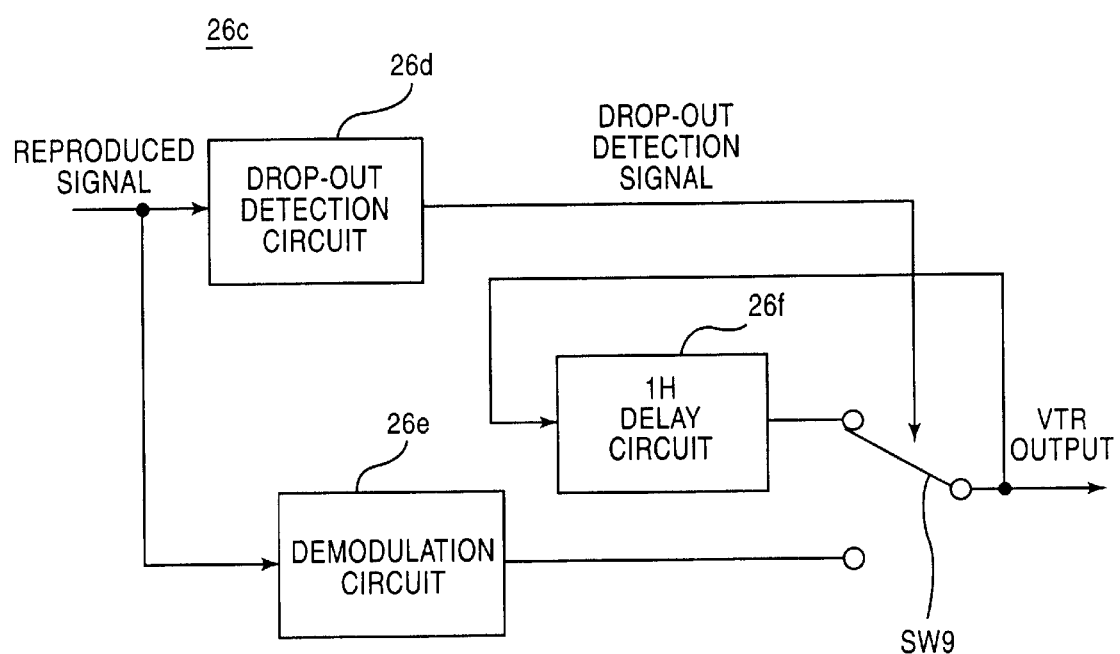
FIG. 4 is a block diagram showing part of the FIG. 1 embodiment.

Referring to FIG. 3, during reproduction the VTR 26 reproduces the signal out of the video tape 28 through a signal reproducing circuit 26b so that a drop-out portion is added by the signal. Specifically, a drop-out portion is detected on the reproduced signal by a drop-out detection circuit 26d as shown in FIG. 4 so that a switch SW9 is controlled by a drop-out detection signal. By doing so, the switch SW9 is connected to the side of a modulation circuit 26e for a period that no dropping out is found, while the switch SW9 is connected to the side of a 1 H delay circuit 26f for a period of detecting dropping out. Therefore, the drop-out portion is added by a signal that corresponds to a portion on the preceding line. For example, if a drop-out detection pulse is outputted as shown in FIG. 6(A) or FIG. 7(A), a composite video signal as shown in FIG. 6(B) or FIG. 7(B) is outputted through the switch SW9.

Figure 6:
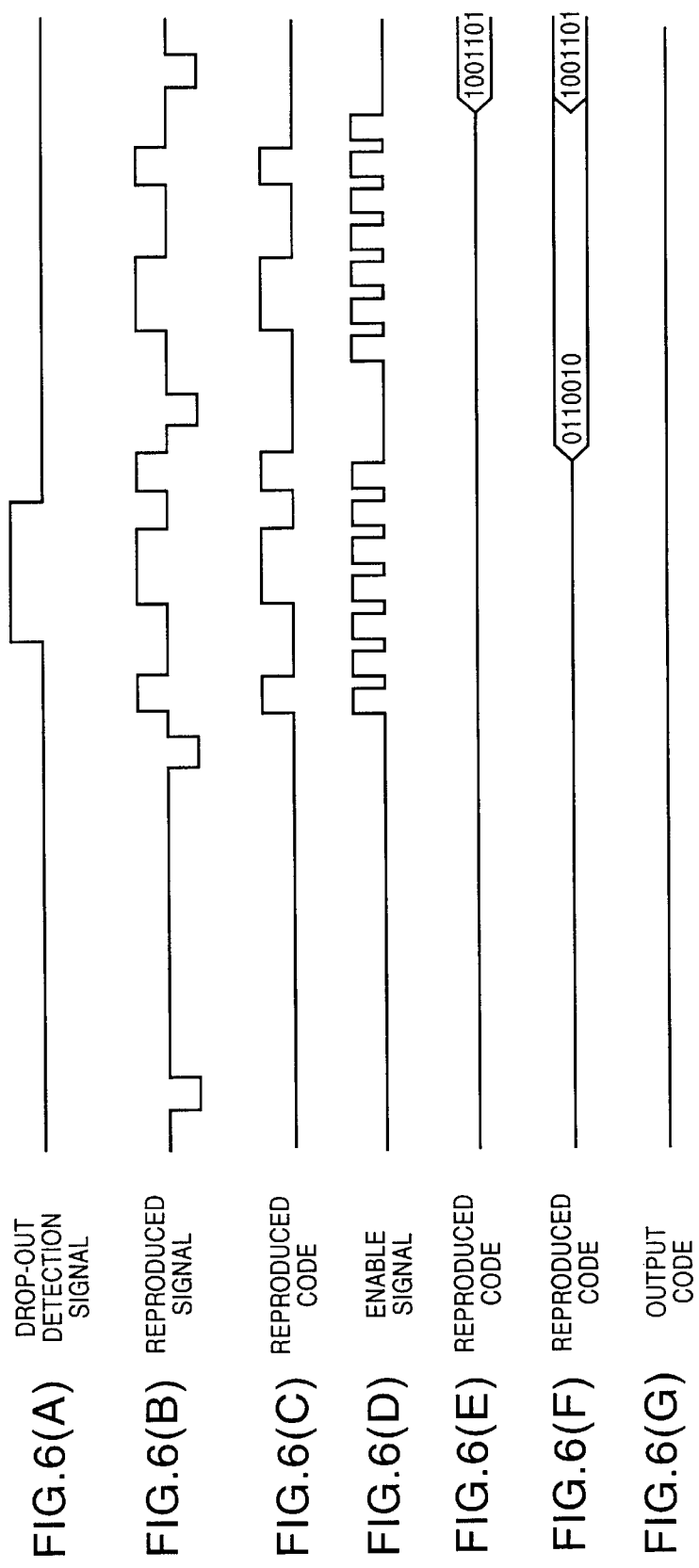
FIG. 6(A) is a waveform diagram showing a drop-out detecting signal.
FIG. 6(B) is a waveform diagram showing a reproduced composite video signal.
FIG. 6(C) is a waveform diagram showing a code contained in the reproduced composite video signal.
FIG. 6(D) is a waveform diagram showing an enable signal.
FIG. 6(E) is an illustrative diagram showing a code outputted from a register 38.
FIG. 6(F) is an illustrative diagram showing a code inverted by an inverting circuit.
FIG. 6(G) is an illustrative diagram showing an output code.
Figure 7:
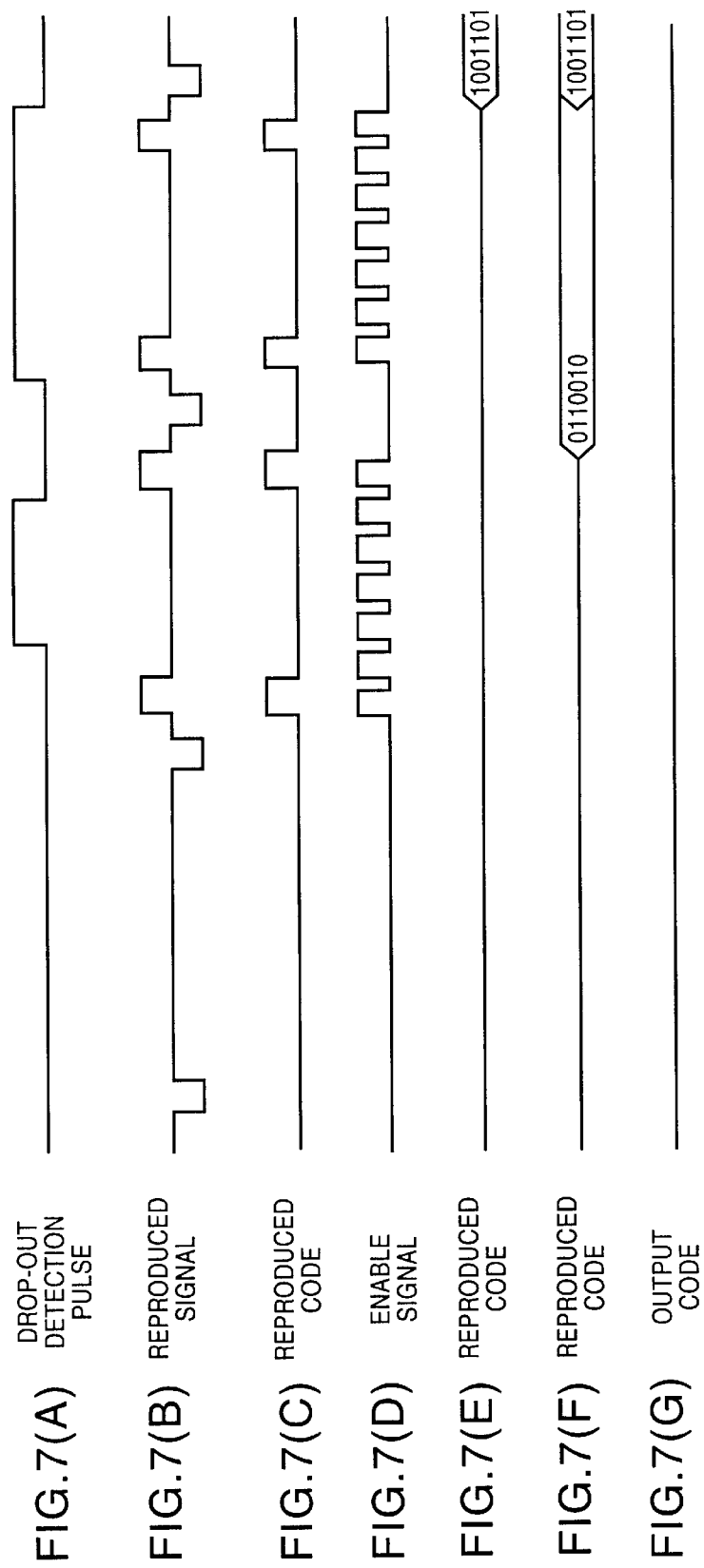
FIG. 7(A) is a waveform diagram showing a drop-out detection pulse.
FIG. 7(B) is a waveform diagram showing a reproduced composite video signal.
FIG. 7(C) is a waveform diagram showing a code contained in the reproduced composite video signal.
FIG. 7(D) is a waveform diagram showing an enable signal.
FIG. 7(E) is an illustrative diagram showing a code outputted from the register 38.
FIG. 7(F) is an illustrative diagram showing a code inverted by an inverting circuit.
FIG. 7(G) is an illustrative diagram showing an output code.
Figure 8:
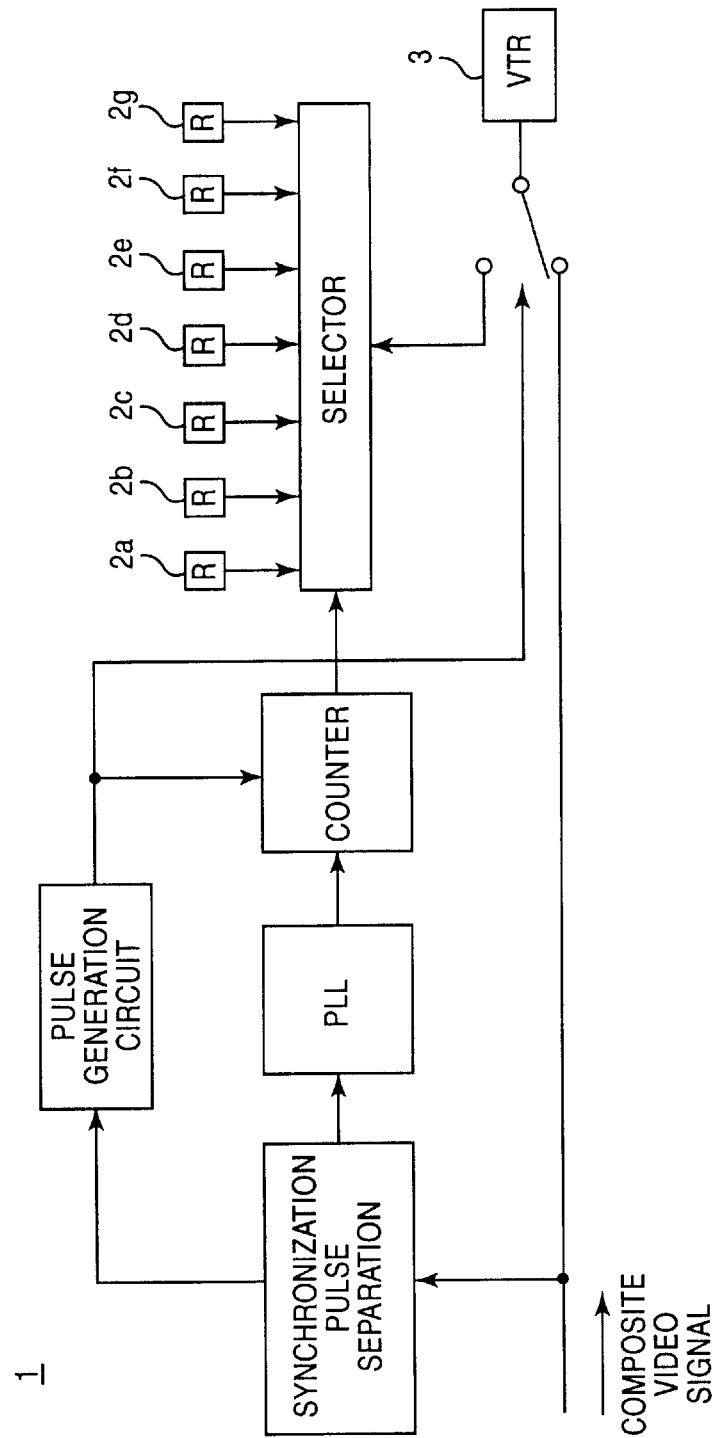
FIG. 8 is a block diagram showing one part of a prior art.
Figure 9:
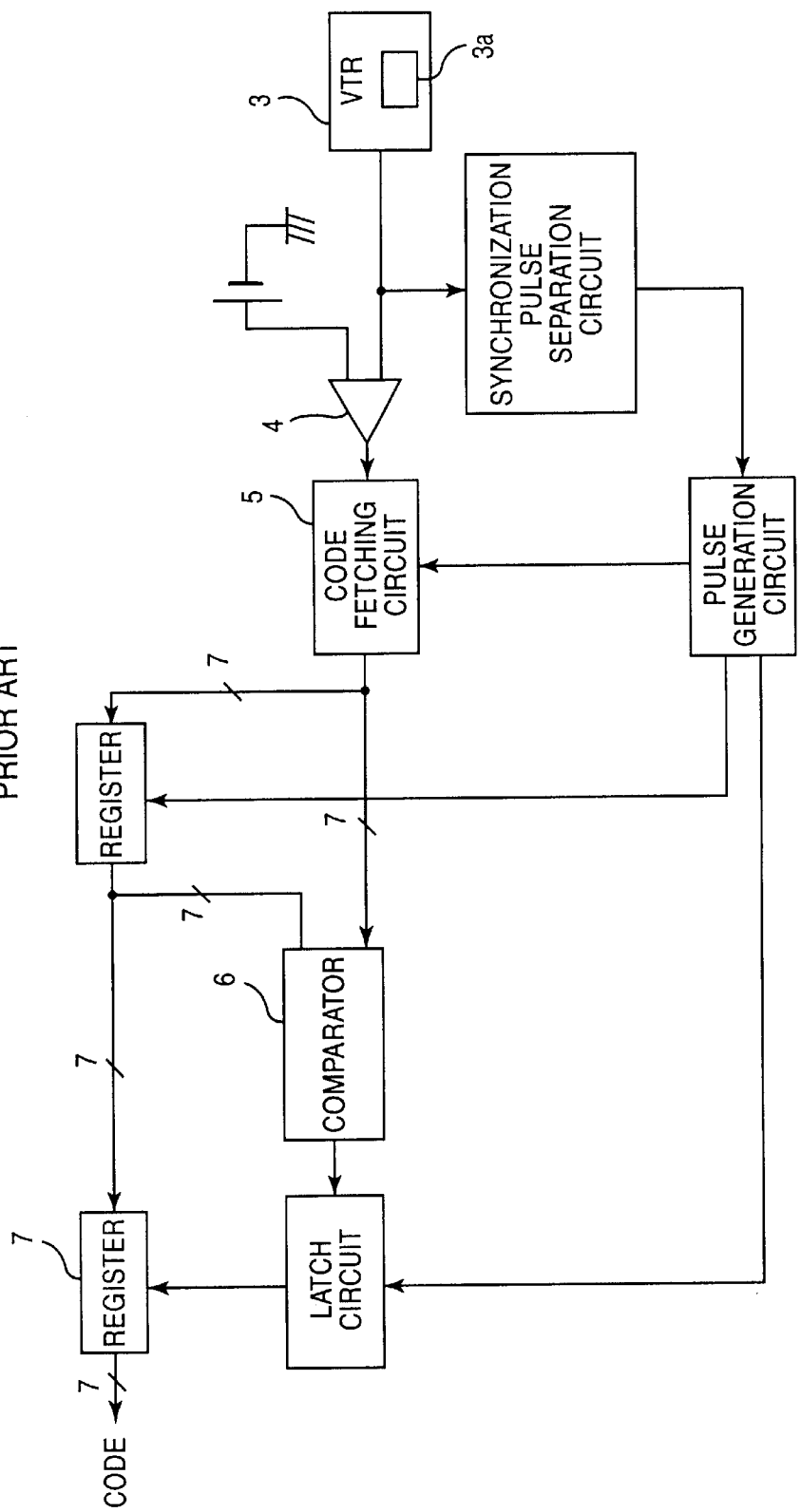
FIG. 9 is a block diagram showing another part of the prior art.

The composite video signal outputted from the VTR 26 is then compared by a voltage signal at a level of 50IRE, so that the first code and the second code contained in the composite video signal are detected as shown in FIG. 5(E), FIG. 6(C) and FIG. 7(C). On the other hand, the synchronization pulse separation circuit 30 detects a vertical synchronization pulse contained in the composite video signal. A pulse generation circuit 36 in turn supplies, based on the detected vertical synchronization pulse as a reference, two kinds of timing pulses and a latch signal to a code fetching circuit 34, a register 38 and a latch circuit 44. Specifically, the code fetching circuit 34 is supplied with pulses of totally 14 in number, as an enable signal, that are superimposed with the first and second codes to have rise portions within a period shown in FIG. 5(F), FIG. 6(D) and FIG. 7(D). The register 38 is supplied with 7 pulses as a writing signal that have rise portions within a period of being superimposed by the first code. The latch circuit 44 is supplied with a latch signal for latching an output of the comparing circuit 42 after the 14 pulses are outputted to the code fetching circuit 34.

The code fetching circuit 34 converts the first code and the second code from the comparator 32 into parallel data according to the enable signal given from the pulse generation circuit 36, thereby supplying the respective parallel data to the register 38 and the inverting circuit 40. The register 38 stores only with the first code according to the writing signal from the pulse generation circuit 36, to output the first code in synchronization with outputting of the second code from the code fetching circuit 34, i.e., at timing as shown in FIG. 5(G), FIG. 6(E) and FIG. 7(E). On the other hand, the inverting circuit 40 outputs an inverted version of the second code at timing as shown in FIG. 5(H), FIG. 6(F) and FIG. 7(F). Consequently, the comparator 42 compares the first code supplied from the register with the inversion of the second code from the inverting circuit 40. The comparator 42 outputs a high level signal when they are coincident with, and a low level signal when not coincident.

In the latch circuit 44, the output from the comparator 42 is latched by the latch signal from the pulse generation circuit 36, and a latch output is delivered as an enable signal to the register 46. Consequently, the first code outputted from the register 38 is stored by the register 46 only when the latch circuit 44 has a high level output, and simultaneously the first code is outputted therefrom. On the other hand, when the output of the latch circuit 44 is at a low level, the first code from the register 38 is not stored by the register 46 so that no output is supplied from the register 46 or otherwise the first code already stored therein is outputted. That is, if the first code and the inversion of the second code are coincident with each other as shown in FIG. 5(G) and FIG. 5(H), the first code is outputted from the register 46 as shown in FIG. 5(J). However, when the first code and the inversion of the second code are not coincident as shown in FIG. 6(E) and FIG. 6(F) as well as FIG. 7(E) and FIG. 7(F), no outputting is made from the register 46 as shown in FIG. 6(G) and FIG. 7(G) or otherwise the first code already stored is outputted therefrom.

In this manner, during recordation the pulse generation circuit 14 performs control on the switch SW8 to thereby multiplex a first code and a second code that is an inversion of the first code on a composite video signal within a vertical blanking period thereof. The multiplexed signal is then recorded on a video tape 28 by means of the VTR 26. On the other hand, during reproduction the first code and the second code are outputted from the code fetching circuit 34 so that the comparator 42 is supplied with the first code and the inversion of the second code in synchronism with each other. Only when these codes are coincident with, the comparator 42 outputs a high level signal, whereby the first code supplied from the register 38 is outputted through the register 46. Meanwhile, if the first code and the inversion of the second code are not coincident, the latch circuit 44 outputs a low level signal so that no output is delivered by the register 46. In this case, however, if the register 46 is already stored with the first code, that code is outputted therefrom. That is, the latch circuit outputs one latch signal par one field. Consequently, if the latch signal is at a high level, the content or the output code of the register 46 is updated in that timing. However, if the latch signal is at a low level, the register 46 outputs the first code that is already stored therein.

According to the present embodiment, since the first code is outputted when the first code and the second code reside in a predetermined relationship, an erroneous code is prevented from being outputted.

Incidentally, in the present embodiment, the second code is created by inverting the entire bits of the first code. However, the second code may be created by inverting parts of bits of the first code such as even numbered bits or odd numbered bits in the first code. Furthermore, although in the present embodiment, the code multiplexing/reading apparatus 10 is connected outside of the VTR 26, it is also possible to install the code multiplexing/reading apparatus inside of the VTR.

Also, the first code and the second code are multiplexed continuously within the period A contained in the vertical blanking period. However, these two codes may be multiplexed within the equalizing period or the vertical blanking period by increasing two times the clock rate. Alternatively, two codes may be multiplexed within the equalizing period or the vertical blanking period. Further, the two codes may be multiplexed spaced in timing apart from each other. Although in this embodiment the first code is outputted when the first code and the inversion of the second code are coincident with each other, it is possible to output an inversion of the second code. That is, when the first code and the second code are in a predetermined relationship, the second code may be turned into the first code for being outputted.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A code multiplexing/reading apparatus adapted to multiplex codes on a video signal to be recorded by a recording device and read the codes multiplexed on the video signal to be reproduced by a reproducing device, comprising:
   a multiplexing means for multiplexing on the video signal a first code and a second code being inverted in bit partly or the entire of the first code;
   a code determining means for determining whether the first code taken out of the reproduced video signal and a code being inverted in bit partly or the entire of the second code taken by the reproduced signal are identical to each other or not; and
   a code storing means for storing as a renewed code by the first code to output a code when said determining means determines the first code and the code being inverted in bit partly or the entire of the second code are identical to each other,
   wherein said code storing means does not renew when said determining means determines that the first code and the code being inverted in bit partly or the entire of the second code are not identical to each other,
   wherein said reproduced signal is a signal in which the dropout is compensated by adding a signal of the last line in a portion in correspondence to a portion that the dropout occurs.

2. A code multiplexing/reading apparatus according to claim 1, wherein said multiplexing means is arranged to multiplex the two codes on the video signal within a vertical blanking period thereof.

3. A code multiplexing/reading apparatus according to claim 1, wherein said determining means includes a storing means for storing the first code, and inverting means for inverting bits partly or in the entire of the second code, and a comparing means for comparing an output of said storing means with an output of said inverting means.

4. A code multiplexing/reading apparatus according to claim 3, wherein said code output means outputs as the predetermined code the output of said storing means.

5. A video recording and reproducing apparatus adapted to record a video signal multiplexed with codes on a medium to be recorded by means of a signal recording means and reproduced the video signal multiplexed with the codes out of the medium to be recorded by means of a signal reproducing means, comprising:
   a multiplexing means for multiplexing on the video signal two codes that are in a predetermined relationship; and
   a code determining means for determining whether the two codes taken out of the video signal reproduced are in the predetermined relationship or not; and
   a code output means for outputting a predetermined code only when said determining means determines the two codes are in the predetermined relationship,
   wherein said predetermined relationship does not include a relationship that the two codes are identical to each other,
   wherein said reproduced signal is a signal in which the dropout is compensated by adding a signal of the last line in a portion in correspondence to a portion that the dropout occurs.

6. A reading device adapted to read codes multiplexed on a video signal to be reproduced by a video reproducing apparatus, comprising:
   a code determining means for determining whether two codes taken out of the reproduced video signal are in a predetermined relationship; and
   a code output means for outputting a predetermined code only when said determining means determines the two codes are in the predetermined relationship,
   wherein said predetermined relationship does not include a relationship that the two codes are identical to each other,
   wherein said reproduced signal is a signal in which the dropout is compensated by adding a signal of the last line in a portion in correspondence to a portion that the dropout occurs.

7. A video reproducing device adapted to reproduce a video signal multiplexed with codes out of a recording medium by a video reproducing means, comprising:
   a code determining means for determining whether two codes multiplexed on the video signal are in a predetermined relationship; and
   a code output means for outputting a predetermined code only when said determining means determines that two codes are in the predetermined relationship,
   wherein said predetermined relationship does not include a relationship that the two codes are identical to each other,
   wherein said reproduced signal is a signal in which the dropout is compensated by adding a signal of the last line in a portion in correspondence to a portion that the dropout occurs.

8. A code multiplexing/reading apparatus adapted to multiplex codes on a video signal to be recorded by a recording device and read the codes multiplexed on the video signal to be reproduced by a reproducing device, comprising:
   a multiplexing circuit for multiplexing on the video signal a first code and a second code being inverted in bit partly or the entire of the first code;
   a comparator for determining whether the first code taken out of the reproduced video signal and a code being inverted in bit partly or the entire of the second code taken by the reproduced signal are identical to each other or not; and
   a code storing circuit for storing as a renewed code by the first code to output a code when said determining means determines the first code and the code being inverted in bit partly or the entire of the second code are identical to each other, wherein said code storing means does not renew when said determining means determines that the first code and the code being inverted in bit partly or the entire of the second code are not identical to each other, wherein said reproduced signal is a signal in which the dropout is compensated by adding a signal of the last line in a portion in correspondence to a portion that the dropout occurs.

9. A video recording and reproducing apparatus adapted to record a video signal multiplexed with codes on a medium to be recorded by means of a signal recording means and reproduced the video signal multiplexed with the codes out of the medium to be recorded by means of a signal reproducing means, comprising:

a multiplexing circuit for multiplexing on the video signal a first code and a second code being inverted in bit partly or the entire of the first code;

a comparator for determining whether the first code taken out of the video signal reproduced and a code being inverted in bit partly or the entire of the second code taken by the reproduced signal are identical to each other or not; and a code storing circuit for storing as a renewed code by the first code to output a code when said determining means determines the first code and the code being inverted in bit partly or the entire of the second code are identical to each other, wherein said code storing means does not renew when said determining means determines that the first code and the code being inverted in bit partly or the entire of the second code are not identical to each other, wherein said reproduced signal is a signal in which the dropout is compensated by adding a signal of the last line in a portion in correspondence to a portion that the dropout occurs.

10. A reading device adapted to read codes multiplexed on a video signal to be reproduced by a video reproducing apparatus, comprising:

a code comparator for determining whether the first code taken out of the reproduced video signal and a code being inverted in bit partly or the entire of the second code taken by the reproduced signal are identical to each other or not; and a code storing circuit for storing as a renewed code by the first code to output a code when said determining means determines the first code and the code being inverted in bit partly or the entire of the second code are identical to each other, wherein said code storing means does not renew when said determining means determines that the first code and the code being inverted in bit partly or the entire of the second code are not identical to each other, wherein said reproduced signal is a signal in which the dropout is compensated by adding a signal of the last line in a portion in correspondence to a portion that the dropout occurs.

11. A video reproducing device adapted to reproduce a video signal multiplexed with codes out of a recording medium by a video reproducing means, comprising:

a code comparator for determining whether the first code multiplexed on the video signal and a code being inverted in bit partly or the entire of the second code taken by the reproduced signal are identical to each other or not; and a code storing circuit for storing as a renewed code by the first code to output a code when said determining means determines the first code and the code being inverted in bit partly or the entire of the second code are identical to each other, wherein said code storing means does not renew when said determining means determines that the first code and the code being inverted in bit partly or the entire of the second code are not identical to each other, wherein said reproduced signal is a signal in which the dropout is compensated by adding a signal of the last line in a portion in correspondence to a portion that the dropout occurs.

* * * * *